US009413720B1

(12) United States Patent
Parviainen-Jalanko et al.

(10) Patent No.: US 9,413,720 B1
(45) Date of Patent: Aug. 9, 2016

(54) PROCESSING PACKETS IN A COMPUTER SYSTEM

(71) Applicant: SSH Communications Security OYJ, Helsinki (FI)

(72) Inventors: Kimmo Parviainen-Jalanko, Helsinki (FI); Petri Helenius, Helsinki (FI)

(73) Assignee: SSH Communications Security OYJ, Helsinki (FI)

( * ) Notice: Subject to any disclaimer, the term of this patent is extended or adjusted under 35 U.S.C. 154(b) by 0 days.

(21) Appl. No.: 14/680,637

(22) Filed: Apr. 7, 2015

(51) Int. Cl.
*H04L 29/06* (2006.01)
*H04L 12/26* (2006.01)

(52) U.S. Cl.
CPC ............ *H04L 63/0254* (2013.01); *H04L 43/02* (2013.01); *H04L 43/04* (2013.01); *H04L 63/1416* (2013.01); *H04L 63/1425* (2013.01); *H04L 69/22* (2013.01)

(58) Field of Classification Search
CPC ............ H04L 63/0254; H04L 63/1416; H04L 63/1425; H04L 43/02; H04L 43/04; H04L 69/22
See application file for complete search history.

(56) References Cited

U.S. PATENT DOCUMENTS

2004/0008711 A1* 1/2004 Lahti ...................... H04L 47/10
370/428
2009/0300354 A1* 12/2009 Shon .................... H04L 63/1466
713/168

OTHER PUBLICATIONS

Hu et al., "Packet leashes: a defense against wormhole attacks in wireless networks.", Retrieved from http://ieeexplore.ieee.org/stamp/stamp.jsp?tp=&arnumber=1209219, INFOCOM 2003. Twenty-Second Annual Joint Conference of the IEEE Computer and Communications. IEEE Societies. vol. 3. IEEE, 2003.*
Intel®, "Packet Classification and Access Control", chapter 28 of Intel® Data Plane Development Kit (Intel® DPDK), Programmer's Guide, Jun. 2014, Document No. 326003-008, pp. 176-182.

* cited by examiner

*Primary Examiner* — Chau Le
*Assistant Examiner* — Muhammad Chaudhry
(74) *Attorney, Agent, or Firm* — Robert P. Michal, Esq.; Carter, DeLuca, Farrell & Schmidt, LLP

(57) ABSTRACT

Processing of packets in a stream of packets where the packets are assigned with sequence numbers is disclosed. Packets are distributed into at least two analysis windows based on predetermined N lowest bits of the sequence numbers, wherein an analysis window includes M lowest bits of the sequence numbers, M being an integer greater than N. N+1 to M lowest bits of the sequence numbers are analyzed in at least one of the analysis windows while ignoring the N lowest bits to determine the ordering of the packets. A packet is determined as suspicious in response to the analysis indicating the packet being in an incorrect position.

12 Claims, 4 Drawing Sheets

| Core A | Packet stream (lowest 4 bits of sequence number) | Core B |
|---|---|---|
| 000n | <- 000\|0 | |
|  | 000\|1 -> | 000n |
| 001n | <- 001\|0 | |
|  | 001\|1 -> | 001n |
| 010n | <- 010\|0 | |
|  | 010\|1 -> | 010n |
| 011n | <- 011\|0 | |
|  | 011\|1 -> | 011n |
| 100n | <- 100\|0 | |
|  | 100\|1 -> | 100n |
| 101n | <- 101\|0 | |
|  | 101\|1 -> | 101n |
| 110n | <- 110\|0 | |
|  | 110\|1 -> | 110n |
| 111n | <- 111\|0 | |
|  | 111\|1 -> | 111n |

Fig. 3

```
Core A          Packet stream        Core B
                (lowest 4 bits of
                 sequence number)
000n       <-   000|0
                000|1    ->          000n
001n       <-   001|0
                001|1    ->          001n
010n       <-   010|0
                010|1    ->          010n
011n       <-   011|0
                011|1    ->          011n
                001|1    ->          001n
100n       <-   100|0
                100|1    ->          100n
101n       <-   101|0
                101|1    ->          101n
110n       <-   110|0
                110|1    ->          110n
111n       <-   111|0
                111|1    ->          111n
```

Fig. 4

PROCESSING PACKETS IN A COMPUTER SYSTEM

FIELD OF THE INVENTION

This disclosure relates to processing of packets in a computer system, and more particularly to parallel processing of packets, for example for detection of suspicious packets such as packets of a possible replay attack.

BACKGROUND INFORMATION

Data is communicated in computerized systems in data packets. Data packets communicated in the system may need to be checked for various reasons. For example, some of the packets can be malicious, and can cause various degrees of harm to a recipient who receives and processes such a packet. The harm can be from a minor nuisance to serious security and/or financial risks. Therefore, various ways to detect suspicious packets before they are processed further by a recipient have been developed.

Replay attacks are one form of malicious activities taking place e.g. in the Internet. In a replay attack a data transmission from a source to a destination is maliciously or fraudulently repeated or delayed. It is an attempt to subvert security by someone who repeats communication of packets, for example, in order to impersonate a valid user, and to disrupt or cause negative impact for legitimate connections. A particular example of these is a denial-of-service (DoS) attack.

Anti-replay methods have been developed to address replay attacks. An example of an attempt to standardize anti-replay is the anti-replay service of IPsec (Internet Protocol Security). IPsec is a protocol suite for securing Internet Protocol (IP) as standardized by the Internet Engineering Task Force (IETF). Anti-replay aims to prevent attackers from injecting packets in communications from source to destination. Anti-replay can be implemented by means of using a unique packet sequence number series per unidirectional security association (SA) established between two nodes of a network. Once a secure connection is established, the anti-replay protocol uses a packet sequence number or a counter to verify the legitimacy of the transmission. When the source sends a message, it adds a sequence number to the packet and increments the sequence number every time it sends another message. The destination receives the message and keeps a history of the sequence numbers and determines the possibility of an attack based on a comparison of the sequence numbers.

Implementation of anti-replay protection requires maintaining a 'global' lower bound of a window for any given SA. If a message has a lower or equal number than the previous message or if the message is below the lower bound, the packet is dropped as suspicious. If the number is larger than the previous one, it is kept and the number thereof is shifted to be the new number and so forth.

Anti-replay protection can be provided for example is association with Encapsulating Security Payload (ESP) operation. The ESP is a member of the Internet Protocol Security (IPsec) protocol suite where it is used to provide origin authenticity, integrity and confidentiality protection of data packets. A security parameter index (SPI) is used to identify the unidirectional SA, the sequence number being then in the next field of ESP packet header.

Anti-replay protection can cause a bottleneck, especially if parallelization of packet decapsulation is provided. This can occur e.g. in keyed-hash message authentication code (HMAC) checking and decryption. HMAC is a specific construction for calculating a message authentication code (MAC) involving a cryptographic hash function in combination with a secret cryptographic key. Even if several cores are provided for parallel processing of the packets, the anti-replay check is based on a window where the packets are checked one at the time whilst the other packets are "locked". This bottleneck can considerably slow down processing of the received packets.

It is noted that the above discussed issues are not limited to any particular system and data processing apparatus but may occur in any system where replacement of keys may be needed.

Embodiments of the invention aim to address one or several of the above issues.

SUMMARY

In accordance with an aspect of the present invention, there is provided a method for processing packets in a stream of packets where the packets are assigned with sequence numbers. The method includes processing packets distributed into at least two analysis windows based on predetermined N lowest bits of the sequence numbers, wherein an analysis window comprises M lowest bits of the sequence numbers, M being an integer greater than N, analysing N+1 to M lowest bits of the sequence numbers in at least one analysis window while ignoring the N lowest bits to determine the ordering of the packets, and determining a packet as suspicious in response to the analysis indicating the packet being in incorrect position.

In accordance with another aspect of the present invention, there is provided an apparatus including at least one processor, and at least one memory including computer program code, wherein the at least one memory and the computer program code are configured, with the at least one processor, to cause the apparatus to process packets of a packet stream distributed into at least two analysis windows based on predetermined N lowest bits of sequence numbers of the packets, wherein an analysis window includes M lowest bits of the sequence numbers, M being an integer greater than N, analyze N+1 to M lowest bits of the sequence numbers in at least one analysis window while ignoring the N lowest bits to determine the ordering of the packets, and determine a packet as suspicious in response to the analysis indicating the packet being in incorrect position.

In accordance with another aspect of the present claimed invention, there is provided a non-transitory computer readable storage medium including program code for causing a processor to process packets assigned with sequence numbers, the packets being distributed from a stream of packets into at least two analysis windows based on predetermined N lowest bits of the sequence numbers, wherein an analysis window includes M lowest bits of the sequence numbers, M being an integer greater than N. The processing includes analysing N+1 to M lowest bits of the sequence numbers in an analysis window while ignoring the N lowest bits to determine the ordering of the packets, and determining a packet as suspicious in response to the analysis indicating the packet being in incorrect position. According to a more detailed aspect the analysing includes comparing N+1 to M lowest bits of a sequence number of a packet to N+1 to M lowest bits of a sequence number of least one other packet. A check for repeated packets in each analysis window can be provided based on the analysis of N+1 to M lowest bits of sequence numbers.

In accordance with another aspect of the present invention, packets are divided into analysis windows based on the N lowest bits of the sequence numbers for parallel check by parallel processing entities. Each processing entity may include a core for analysing ordering of packets in at least one analysis window. The parallel processing entities may also include network nodes each maintaining at least one analysis window, wherein the stream of packets is distributed over the network nodes for processing.

Parallel decapsulation of the packets and distribution of packets into the analysis windows according to the parallelised decapsulation can be provided.

A replay attack can be determined based on the analysis.

Certain more detailed aspects are evident from the detailed description.

BRIEF DESCRIPTION OF THE DRAWINGS

Various exemplifying embodiments of the invention are illustrated by the attached drawings. Steps and elements may be reordered, omitted, and combined to form new embodiments, and any step indicated as performed may be caused to be performed by another device or module. In the Figures:

FIG. 3 shows an example of how sequence numbers of packets can be divided into analysis windows;

FIG. 4 shows an example of how sequence numbers of packets can be divided into analysis windows;

DETAILED DESCRIPTION

Figure 1:
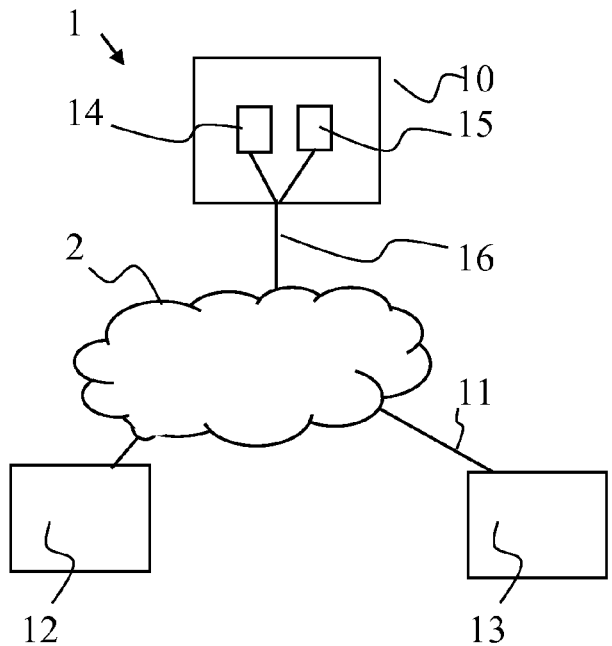
FIG. 1 illustrates an example of a computer network where the invention can be embodied.

FIG. 1 shows an example of a computerized system 1 where the herein described principles may be embodied. The system includes a data network 2 via which devices connected thereto may communicate with each other. The data network can include a large network such as an Internet Protocol (IP) based global network system or be provided in e.g. a closed Intranet of an enterprise or similar organization. Communications between the various entities can be based on, e.g., an IPv4 (Internet Protocol version 4) or IPv6 (Internet Protocol version 6).

The exemplifying arrangement of FIG. 1 shows three computer devices 10, 12 and 13 connected to the data network 2. These can be any appropriate computer device adapted for data communication. For example, the devices can include user devices such as mobile or desktop terminals, servers, or machine type devices. A device can communicate data packets with other devices connected to the system. Packet switched communication links to the network 2 are illustrated by lines 11.

Numeral 16 is used to denote a stream of packets received by device 10. The device can receive data packets from various sources. Some of the packets can be malicious. Therefore mechanisms have been developed to detect suspicious packets from the received stream of data.

A device can be provided with a plurality of processing cores. In FIG. 1 device 10 is shown to include two cores 14 and 15. However, a larger number of cores can be provided, depending of the application. A core refers to a processing entity that can provide independent data processing. A data processor can be configured to provide several independent data processing entities, and thus several cores.

Figure 2:
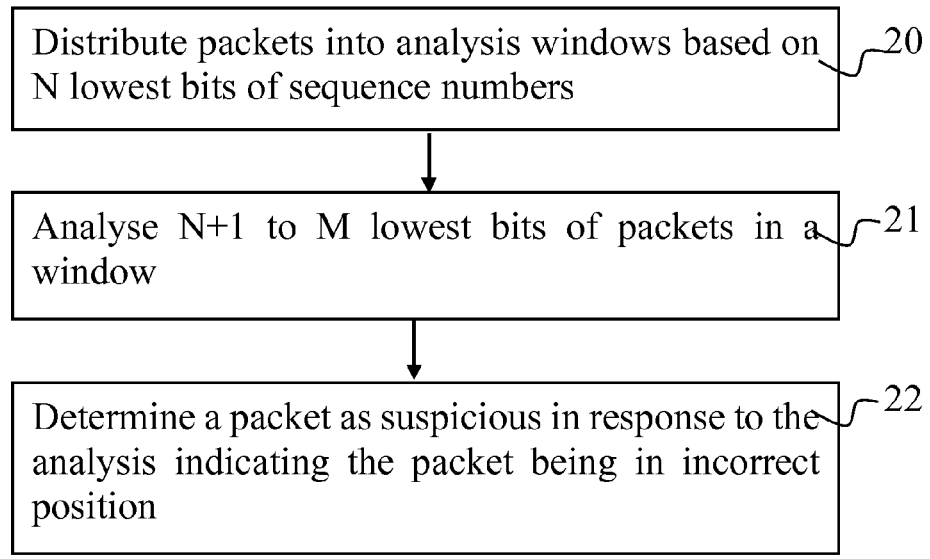
FIG. 2 shows a flowchart in accordance with a certain embodiment.

In the herein described examples, packets are equally distributed to $2^N$ processor cores by taking into account the sequence number, e.g., the SPI, and the lowest N bits of the sequence number. In accordance with an aspect shown in FIG. 2, packets in a stream of packets and with sequence numbers are distributed at step 20 into at least two analysis windows based on predetermined N lowest bits of the sequence numbers. An analysis window includes M lowest bits of the sequence numbers, M being an integer greater than N. Step 21 includes analysing N+1 to M lowest bits of the sequence numbers for at least one of the analysis windows while ignoring the N lowest bits to determine the ordering of the packets. At 22 a packet can be determined as suspicious in response to the analysis indicating the packet being positioned incorrectly.

The position can be determined incorrect relative to the at least one other packet or another relation, for example, a lower or upper position threshold. For example, the analyzing can include comparing N+1 to M lowest bits of a sequence number of a packet to N+1 to M lowest bits of a sequence number of least one other packet.

The analysis can be for checking for repeated packets in each analysis window based on the analysis of N+1 to M lowest bits of sequence numbers. The packets can be divided into analysis windows for parallel check by parallel processing entities. Each processing entity can include a processing core maintaining its own window. The analysis can be provided for detecting a replay attack.

The analysis window size can be selected to be a multiple of the number of cores used for checking the data packet stream. When the window size is selected to be a multiple of the number of cores, each core can maintain their own analysis window, for example, anti-replay window.

The analysis window, and hence the processing, is simplified by discarding the lowest N bits of the sequence number as they are guaranteed to be static for the respective core scope and always equal to the 'core index'. This way operations such as the decapsulation of the packets can be implemented in parallel in a manner where no locking is required.

An example where two parallel core processing entities, termed Core A and Core B, are provided with their respective check windows is illustrated in FIG. 3. In this example N=1 and M=4. The lowest four bits of an incoming packet stream are shown in the middle column. Based on the lowest bit (0 or 1) the four lowest bits are placed in the window of Core A, if the lowest bit is 0, or Core B, if the lowest bit is 1. The core can be configured to be capable of ignoring (dropping) all packets with the lowest bit(s) not matching its own core index. In FIG. 3 this is denoted by marking the lowest bit by 'n'. Each core can then analyze in parallel the three bits in their respective windows to see if the sequence numbers are in ascending order.

In FIG. 3, data packets in each window appear to arrive in a correct order, i.e. the analyzed parts of the lowest bits are in ascending order for bits Core A and Core B. FIG. 4 shows instead a scenario where one of the sequence numbers (emphasized in bold) with four lowest bits 0011 is received twice. The $2^{nd}$ reception of 0011 can be considered as taking place incorrectly as the value of the analyzed lowest bits (001) is out of place from the otherwise ascending order of sequence numbers of the Core B window.

More particularly, the lowest bit of the sequence number (bit value 0011) is 1, so the number belongs to the window of Core B. In the Core B window the lowest bit is then ignored and the three remaining bits 001 are used in the analysis as the basis of comparison to at least one other sequence number in the window. The three bits 001 of the second instance of this packet indicate a lower sequence number than the three bits 011 of the preceding sequence number, wherefrom it can be determined that this packet was received too late/is out of order and is therefore suspicious.

Typically the decision of what to do would be to drop the packet.

At the same time, Core A also analyzes packets with 0 as the lowest bit of the sequence number in its check window. Thus two parallel check operations can be provided. For Core A all packets appear to be arriving in correct order.

A similar principle can be applied to a larger number of cores. For example, if four cores A-D are used, each having its own check window, the distribution to these windows can be based on the lowest two bits of the sequence number e.g. as follows:

00→Core A
01→Core B
10→Core C
11→Core D

A larger number of cores, e.g. 8, 16, 32 . . . can be employed accordingly.

Each processor entity for parallel processing of e.g. packet decapsulation can be provided with its own window and parallel check processing. This may not be necessary in all application and e.g. 32 decapsulation processor entities may be provided with 16, 8, 4 or 2 check windows, depending on the application.

A possibility for implementing the distribution is to use a programmable hardware packet classification such as described in chapter 28, "Packet Classification and Access Control" of Intel Data Plane Development Kit documentation (http://dpdk.org/doc/intel/dpdk-prog-guide-1.7.0.pdf).

Figure 5:
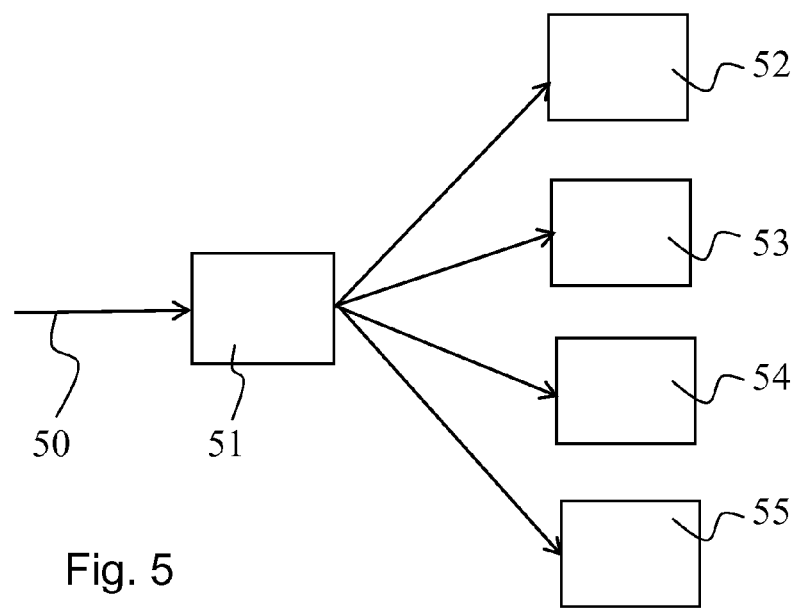
FIG. 5 shows another example of network nodes for processing a data stream.

In the above, the checking is distributed between cores. The same approach can be used to distribute processing over multiple network nodes. Thus, instead core scenarios are also possible where there is, for example, a load balancer or another packet stream distributor in front of a multiple of network nodes each including processor apparatus for performing parallel further processing of the packets in a data stream. For example, the network nodes can provide parallel traffic decapsulation. An example of this is shown in FIG. 5 where data steam 50 is divided by a load balancer 51 between four separate network nodes 52, 53, 54 and 55.

Figure 6:
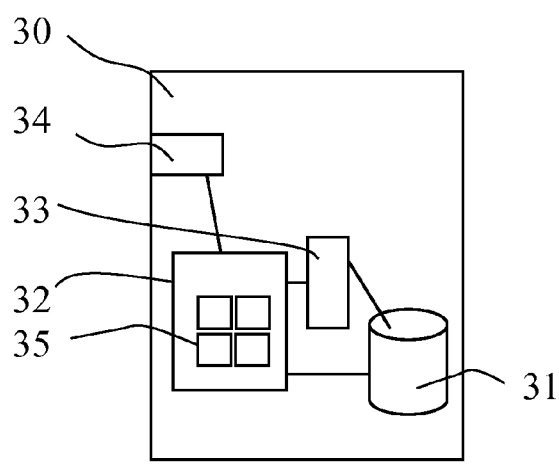
FIG. 6 shows data processing apparatus.

FIG. 6 shows an example of a control apparatus for a device capable of providing the above described functions of distributing and analyzing packets based on their sequence numbering. The control apparatus 30 can be, for example, integrated with, coupled to and/or otherwise controlling any of the devices 10, 12 and/or 13 of FIG. 1 or nodes 51-55 of FIG. 5. For this purpose the control apparatus includes at least one memory 31, at least one data processing unit 32, 33 and an input/output interface 34. Via the interface the control apparatus can be coupled to the data network. The control apparatus can be configured to execute an appropriate software code to provide the control functions. The control apparatus can also be interconnected with other control entities. In this example processor 32 is shown to provide four cores 35. However, it is possible to have a multiple of processors providing the cores and/or a larger number of cores.

The various embodiments and their combinations or subdivisions may be implemented as methods, apparatus, or computer program products. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

According to an embodiment there is provided a computer program including code means adapted to perform, when the program is run on processor apparatus, the above described methods.

While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The foregoing description provides by way of exemplary and non-limiting examples a full and informative description of exemplary embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this invention.

We claim:

1. A method for processing packets in a stream of packets where the packets are assigned with sequence numbers, the method comprising:
   distributing the packets into at least two analysis windows based on predetermined N lowest bits of the sequence numbers for parallel check by parallel processing entities,
   wherein an analysis window comprises M lowest bits of the sequence numbers, M being an integer greater than N, and
   each processing entity comprises a core for analyzing ordering of packets in at least one analysis window,
   parallel processing of the packets distributed into the at least two analysis windows,
   the processing comprising analyzing, by a computer processor, N+1 to M lowest bits of the sequence numbers in at least one analysis window while ignoring the N lowest bits to determine the ordering of the packets based on comparison of N+1 to M lowest bits of a sequence number of a packet to N+1 to M lowest bits of a sequence number of least one other packet, and
   determining a packet as suspicious in response to the analysis indicating the packet being in incorrect position.

2. The method according to claim 1, further comprising checking for repeated packets in each analysis window based on the analysis of N+1 to M lowest bits of sequence numbers.

3. The method according to claim 1, wherein the parallel processing entities comprise network nodes each maintaining at least one analysis window, the method further comprising distributing the stream of packets over the network nodes for processing.

4. The method according to claim 1, further comprising parallel decapsulation of the packets and distribution of packets into the analysis windows according to the parallelized decapsulation.

5. The method according to claim 1, further comprising determination of a replay attack based on the analyzing.

6. An apparatus comprising at least one computer processor, and at least one memory including computer program code, wherein the at least one memory and the computer program code are configured, with the at least one computer processor, to cause the apparatus to:
distribute packets of a packet stream into at least two analysis windows based on predetermined N lowest bits of the sequence numbers for parallel check by parallel processing entities,
wherein an analysis window comprises M lowest bits of the sequence numbers, M being an integer greater than N, and
each processing entity comprises a core for analyzing ordering of packets in at least one analysis window,
parallel process the packets of the packet stream distributed into at least two analysis windows,
to analyze, by a computer processor, N+1 to M lowest bits of the sequence numbers in at least one analysis window while ignoring the N lowest bits to determine the ordering of the packets based on comparison of N+1 to M lowest bits of a sequence number of a packet to N+1 to M lowest bits of a sequence number of least one other packet, and
determine a packet as suspicious in response to the analysis indicating the packet being in incorrect position.

7. The apparatus according to claim 6, wherein the apparatus is further configured to check for repeated packets in an analysis window based on the analysis of N+1 to M lowest bits of sequence numbers.

8. The apparatus according to claim 6, wherein the parallel processing entities each comprise a network node maintaining at least one analysis window, the apparatus comprising a node for distributing a received stream of packets over the network nodes for processing.

9. The apparatus according to claim 6, wherein the apparatus is further configured for parallel decapsulation of packets in the stream of packets and distribution of the packets into the analysis windows according to the parallelized decapsulation.

10. The apparatus according to claim 6, wherein the apparatus is further configured to determine a replay attack based on the analysis.

11. A non-transitory computer readable storage medium comprising program code for causing a processor to:
process packets assigned with sequence numbers, the packet being distributed from a stream of packets into at least two analysis windows based on predetermined N lowest bits of the sequence numbers for parallel check by parallel processing entities,
wherein an analysis window comprises M lowest bits of the sequence numbers, M being an integer greater than N, and
each processing entity comprises a core for analyzing ordering of packets in at least one analysis window,
parallel processing of the packets distributed into the at least two analysis windows,
the processing comprising analyzing, by a computer processor, N+1 to M lowest bits of the sequence numbers in an analysis window while ignoring the N lowest bits to determine the ordering of the packets based on comparison of N+1 to M lowest bits of a sequence number of a packet to N+1 to M lowest bits of a sequence number of least one other packet, and
determining a packet as suspicious in response to the analysis indicating the packet being in incorrect position.

12. The non-transitory computer readable storage medium according to claim 11, wherein the processing further comprising checking for repeated packets in each analysis window based on the analysis of N+1 to M lowest bits of sequence numbers.

\* \* \* \* \*